US007086940B2

(12) United States Patent
Osborn

(10) Patent No.: US 7,086,940 B2
(45) Date of Patent: Aug. 8, 2006

(54) SYSTEM FOR PREVENTING CARCASS SCORCHING

(75) Inventor: Matthew S. Osborn, Wichita, KS (US)

(73) Assignee: Cargill Meat Solutions Corporation, Wichita, KS (US)

( * ) Notice: Subject to any disclaimer, the term of this patent is extended or adjusted under 35 U.S.C. 154(b) by 0 days.

(21) Appl. No.: 10/277,774

(22) Filed: Oct. 22, 2002

(65) Prior Publication Data
US 2004/0214516 A1   Oct. 28, 2004

(51) Int. Cl.
A22B 5/00 (2006.01)
(52) U.S. Cl. .................................... 452/198
(58) Field of Classification Search ................ 452/198
See application file for complete search history.

(56) References Cited

U.S. PATENT DOCUMENTS

| 3,689,958 | A | * | 9/1972 | Dillon ........................ 99/517 |
| 3,916,777 | A | * | 11/1975 | Earl ............................ 99/533 |
| 4,221,021 | A | * | 9/1980 | Swilley ....................... 452/141 |
| 4,810,515 | A | * | 3/1989 | Bourdel ...................... 426/524 |
| 4,862,557 | A | * | 9/1989 | Clayton et al. ............... 99/534 |
| 4,916,775 | A | * | 4/1990 | Gallant ........................ 452/14 |
| 5,334,084 | A | * | 8/1994 | O'Brien et al. .............. 452/157 |
| 5,484,332 | A | * | 1/1996 | Leech et al. ................. 452/173 |
| 5,520,575 | A | * | 5/1996 | Dickson ...................... 452/125 |
| 5,882,253 | A | * | 3/1999 | Mostoller .................... 452/173 |
| 5,976,005 | A | * | 11/1999 | Wilson et al. ............... 452/173 |
| 5,980,375 | A | * | 11/1999 | Anderson et al. ............. 452/77 |
| 6,019,033 | A | * | 2/2000 | Wilson et al. ................ 99/470 |
| 6,290,592 | B1 | * | 9/2001 | Allen et al. .................... 452/58 |
| 6,291,003 | B1 | | 9/2001 | Riemann et al. |
| 6,551,182 | B1 | * | 4/2003 | Caracciolo, Jr. ............... 45/81 |

* cited by examiner

*Primary Examiner*—Thomas Price
(74) *Attorney, Agent, or Firm*—Dorsey & Whitney, LLP

(57) ABSTRACT

The present invention is a system and method for rapidly cooling the exposed lean surfaces of a beef carcass. The system is adapted to reach important muscle regions, including the interior muscles located in the cavity of the carcass side. The system includes at least one nozzle disposed at an angle with respect to a line extending perpendicular to the carcass, such that a coolant contacts muscles located inside the cavity.

23 Claims, 4 Drawing Sheets

SYSTEM FOR PREVENTING CARCASS SCORCHING

FIELD OF THE INVENTION

The present invention relates to a steam pasteurization system and method for destroying coliform bacteria and other surface pathogens on a carcass. More particularly, it relates to a system and method for rapidly cooling the exposed lean surfaces of a beef carcass after exposure to steam.

BACKGROUND OF THE INVENTION

Concerns over surface pathogens on meat have been elevated in recent years due to *E-coli* related illnesses and deaths. In response, the USDA has imposed regulations and recommendations on food preparers to increase the likelihood that surface pathogens are killed prior to consumption. For example, restaurants must cook hamburger at 160° Fahrenheit throughout.

These end user regulations have been made in an attempt to address a microbiological issue that begins during meat processing. During the slaughter and fabrication processes, *Escherichia coli* ("*E. coli*"), other coliform bacteria, as well as other pathogens may occasionally reside on the surface of the meat carcass. These pathogens may originate from fecal matter and other contaminants on the surface of the meat. To prevent delivery of contaminated meat to the consumer, the distributor, or the retailer, these pathogens are destroyed or removed prior to packaging and shipping. If such contaminants are not removed, it is then left to the consumer or preparer of the meat to address the problem of destroying the pathogens. By this time, the bacteria may have multiplied on the surface and throughout the meat. This is especially the case with ground meat, because the surface pathogens are distributed throughout the meat during the grinding process.

To reduce the number of surface pathogens, many meat processing facilities employ steam pasteurization treatment of carcass sides prior to fabrication. A typical steam pasteurization process includes removing surface water from the meat, directing steam at the meat to heat the surface to an appropriate level and cooling the meat to prevent scorching or localized cooking. Such steam pasteurization techniques are disclosed, for example, in U.S. Pat. No. 6,291,003, entitled "Method and Apparatus for Steam Pasteurization of Meat," issued Sep. 18, 2001, and U.S. Pat. No. 5,976,005, entitled "Apparatus for Steam Pasteurization of Meat," issued Nov. 2, 1999.

These prior art steam pasteurization techniques, however, lack an adequate cooling process. Inadequate cooling of the meat after exposure to steam may result in scorching or cooking of the carcass surface meats. Such scorching or cooking results in an undesirable discoloration of the meat, which has a negative impact on consumers.

There is a need in the art for a system and method of rapidly cooling the lean surfaces of a carcass after exposure to steam to prevent scorching or cooking of the meat. There is a further need for a carcass cooling system adapted to reach interior muscles of the meat carcass.

BRIEF SUMMARY OF THE INVENTION

The present invention, in one embodiment, is a device for cooling a portion of a carcass side. In this embodiment, the device includes a supply pipe connected to a coolant source and a plurality of cooling nozzles coupled to the supply pipe. One of the nozzles of the cooling nozzles is disposed at an angle sufficient to allow the coolant to contact interior muscles located within a cavity portion of the carcass side.

The present invention, in another embodiment, is a method of cooling a portion of a carcass side. In this embodiment, the method includes guiding the carcass side into a cooling chamber. Next a coolant is directed toward the carcass side at an angle that is sufficient to cause the coolant to contact interior muscles located within a cavity portion of the carcass side.

In another embodiment, the present invention is a method of processing a carcass side. The method includes providing a carcass side having interior muscles located within a cavity. A vertebra of the carcass side is separated to allow stretching of the surrounding muscle. The carcass side is then steam pasteurized and guided into a cooling chamber where coolant is directed toward the carcass side at an angle sufficient to cause coolant to contact interior muscles located within the cavity of the carcass side.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
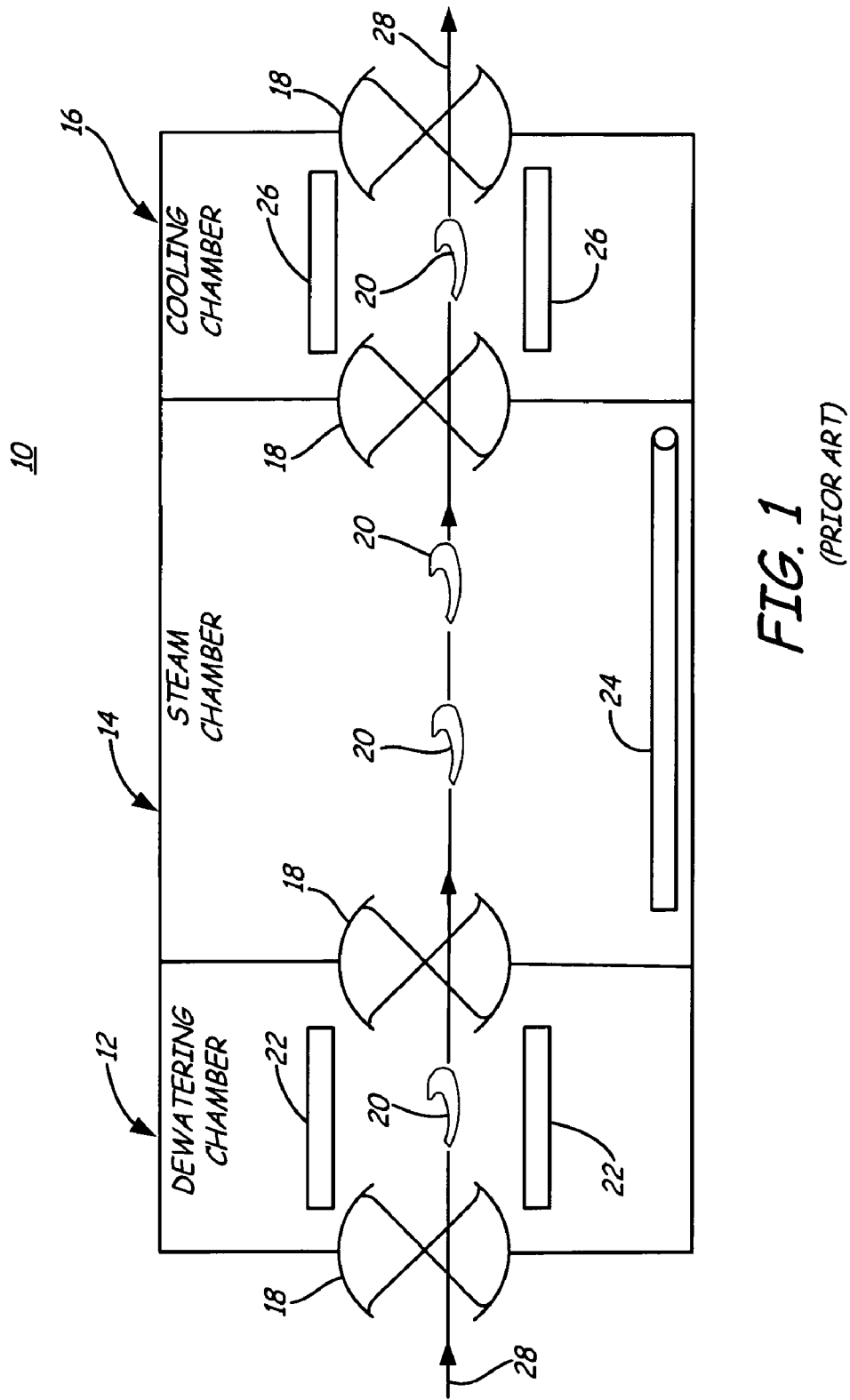
FIG. 1 is a schematic view of a steam pasteurization system as known in the prior art.

FIG. 1 is a schematic view of a steam pasteurization system 10 as known in the prior art. As shown in FIG. 1, the steam pasteurization system 10 includes a dewatering chamber 12, a steam chamber 14, and a cooling chamber 16. The chambers 12, 14, 16 may be separated from each other and from the external environment by doors 18. The chambers are adapted to operate on a side of a meat carcass 20 traveling through the system 10. The dewatering chamber 12 includes air banks 22 for directing air flow at the side 20 to remove surface moisture prior to entering the steam chamber 14. The steam chamber 14 includes a steam pipe 24 for directing steam at the side 20 to kill any surface pathogens present on the side 20. The cooling chamber 16 includes coolant spray nozzles 26 for directing a coolant at the side 20. The spray nozzles 26 direct coolant toward the side 20 in a direction perpendicular to the direction of travel of the carcass as indicated by the arrow 28.

In one embodiment of the present invention, the steam pasteurization system 10 is located along a meat processing line. In one embodiment, the dewatering chamber 12 is not an enclosed area, but instead is an open air location along a meat processing line, which includes air banks 22 or air jets directed toward the side 20.

Figure 2:
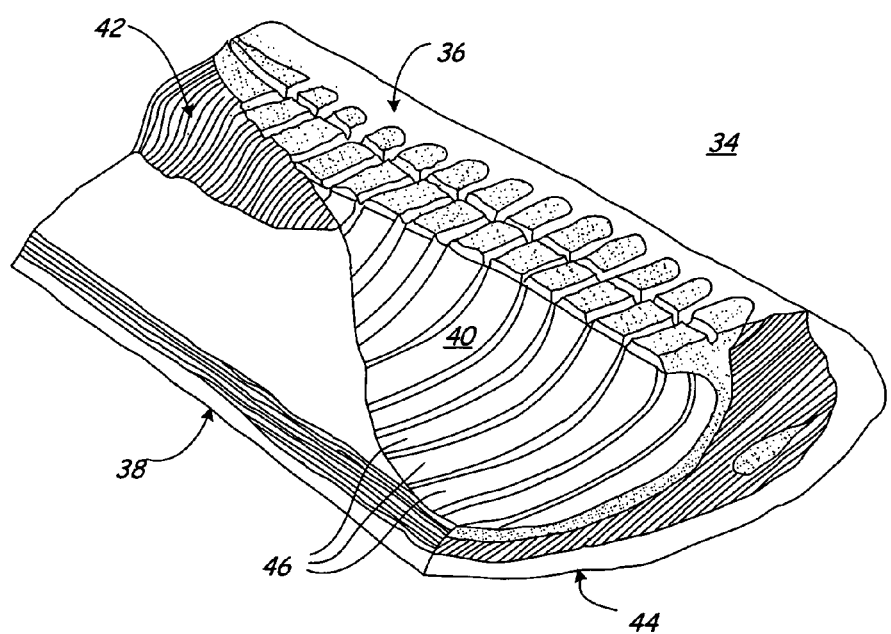
FIG. 2 is a perspective view of a central portion of a side of a beef carcass.

FIG. 2 is a perspective view of a portion of a side of a beef carcass 34. As shown in FIG. 2, the side 34 includes a bone side 36 and a fat side 38. The side further includes a cavity 40. FIG. 2 further shows the location of the loin 41, the tenderloin 42, the flank 44, and the skirt 46 of the side 34. As shown, each of these interior muscles of the side 34 are located generally in the area of the cavity 40. The cavity 40 is an area extending longitudinally through a portion of the center of the side 34. The cavity 40 is defined by the loin 41 and the tenderloin 42 located near the spinal column and the flank 44 located opposite the spinal column. The cavity 40 of the beef carcass is exposed upon evisceration of the carcass. As shown in FIG. 2, portions of the surface of the tenderloin 42 and the flank 44, which define the cavity 40, are thus disposed at an acute angle with respect to a plane extending through the center of the side 34.

Figure 3:
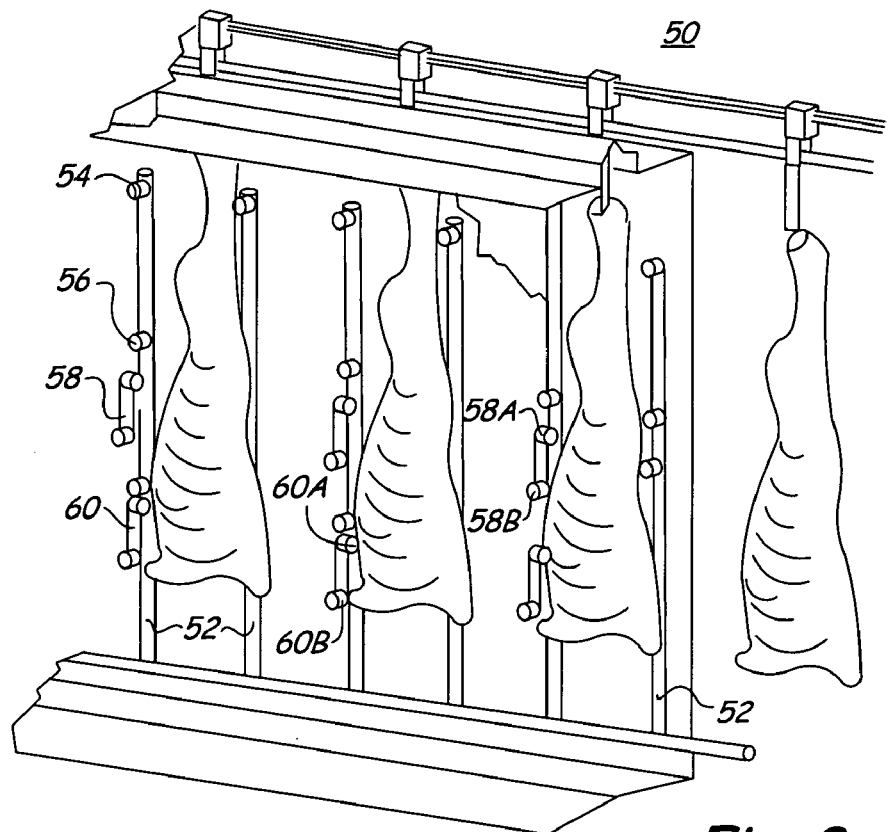
FIG. 3 is a perspective view of a portion of a cooling chamber according to one embodiment of the present invention.

FIG. 3 shows a perspective view of a portion of a cooling chamber 50 according to one embodiment of the present invention. As shown in FIG. 3, carcasses 34 are carrier along a rail running through the cooling chamber 50. As further shown, the cooling chamber 50 includes several coolant supply pipes 52. In the embodiment shown in FIG. 3, each of the coolant supply pipes 52 includes four coolant nozzles 54, 56, 58, 60. The coolant supply pipes are connected to a pressurized coolant source. In one embodiment of the present invention, the coolant is water. In one embodiment, the coolant pressure exiting each of the nozzles is from about 10 psi to about 100 psi, and the corresponding volumetric flow rate of coolant through each nozzle is from about 0.48 to about 1.4 gallons per minute. In another embodiment, the coolant pressure exiting each of the nozzles is from about 30 psi to about 50 psi, and the corresponding volumetric flow rate of coolant through each nozzle is from about 0.80 to about 1.1 gallons per minute. In yet another embodiment, the coolant pressure exiting each of the nozzles is about 40 psi, and the corresponding volumetric flow rate of coolant through each nozzle is about 0.91 gallons per minute As shown in FIG. 3, the coolant nozzles 58 and 60 each include two spray nozzles 58a, 58b and 60a, 60b. The spray nozzles 58a and 58b, and the spray nozzles 60a and 60b, are directed to opposite sides of a plane extending perpendicular to the sides 34. In one embodiment, the spray nozzles 58a and 58b, and the spray nozzles 60a and 60b, are each disposed at an angle of from about 10 to about 50 degrees from the line extending perpendicular to a direction of travel of the carcass, to direct coolant into the cavity of the carcass. In another embodiment, the spray nozzles are each disposed at an angle of about 30 degrees. In another embodiment, the spray nozzles 58a and 58b, and the spray nozzles 60a and 60b, are disposed at other opposing angles, with respect to the line extending perpendicular to the direction of travel of the carcass, sufficient to direct the coolant into the cavity of the carcass. In other embodiments, more or fewer of the coolant nozzles 54, 56, 58, 60 include oppositely disposed spray nozzles.

In one embodiment, the coolant nozzles 54 and 56 are located about nineteen inches and about thirty inches, respectively, from an anterior end of the carcass. In one embodiment, the coolant nozzles 58 and 60 are located about forty and about fifty-two inches from the anterior end of the carcass. The coolant nozzles 58 and 60 are located at a point with respect to the carcass to target the tenderloin and flank. Accordingly, in other embodiments, the positions of the coolant nozzles 54 and 58 are varied to correspond to these portions of the carcass. In one embodiment, the coolant nozzles 58 and 60 are ⅛ inch nozzles having a volumetric flow capacity of between 0.34 gallons per minute at 5 psi and 1.7 gallons per minute at 150 psi.

Figure 4:
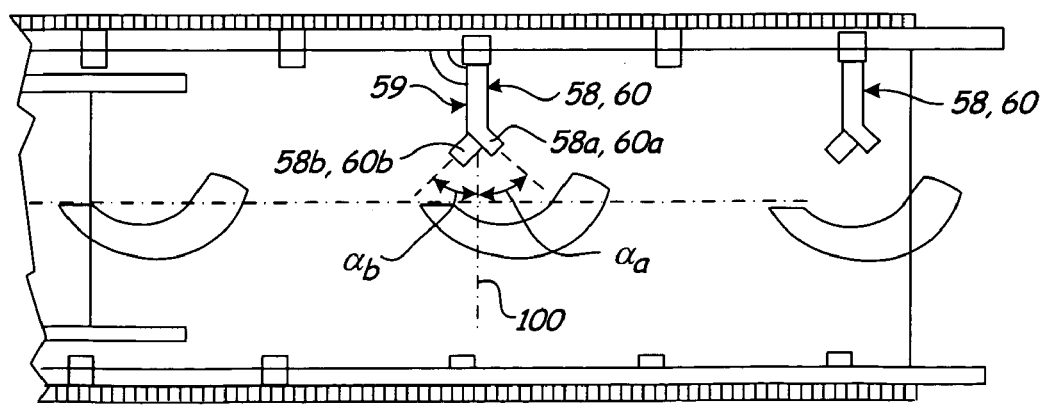
FIG. 4 is a sectional view of a cooling chamber according to one embodiment of the present invention.

FIG. 4 is a top sectional view of the cooling chamber 50 of FIG. 3, including carcasses 34 located within the cooling chamber 50. As shown in FIG. 4, the coolant nozzles 58, 60 include spray nozzles 58a, 60a and 58b, 60b disposed at opposite angles $\alpha_a$ and $\alpha_b$ with respect to a line 100 extending perpendicular to the direction of travel of the carcass. As shown in FIG. 4, the coolant nozzles 58, 60 are located only on the bone side of the carcass, and not on the fat side of the carcass. In other embodiments of the present invention, the cooling nozzles 58, 60 are located on both the bone side and the fat side of the carcass. As also shown in FIG. 4, the cooling nozzles 58 and 60 include a neck 59 extending from the supply pipes 52, which places the coolant spray point closer to the carcass. The neck 59 also increases the ability of the nozzles 58 and 60 to direct coolant spray into the cavity of the carcass. In one embodiment, the neck 59 extends from the supply pipe 52 a sufficient distance to place the cooling nozzles 58 and 60 to within from about 1 to about 12 inches from the carcass. In another embodiment, the neck 59 extends from about 2 to about 12 inches from the supply pipe 52.

During operation of the cooling chamber 50 of the present invention, carcasses travel through the cooling chamber and past the nozzles 54, 56, 58, 60. Coolant is forced through the nozzles and directed toward the carcass. The opposing spray nozzles 58a, 58b and the opposing spray nozzles 60a, 60b direct the coolant spray into the cavity of the carcass, as the carcass travels past the nozzles. The angle of the spray nozzles 58a, 58b and 60a, 60b allows the coolant to directly contact the portions of the side 34 located in the cavity 40, including the interior muscles. This direct contact results in rapid cooling of these portions, which includes the tenderloin 42 and flank 44. Furthermore, the cooling rate is increased because the coolant nozzles 58 and 60 are disposed closer to the side 34. The oppositely disposed spray nozzles also allow a larger volume of cooling fluid to enter into direct contact with the surface of the tenderloin 42 and flank 44. The oppositely disposed spray nozzles are located at a height corresponding to the portion of the side 34 for which rapid cooling is desired.

Figure 5:
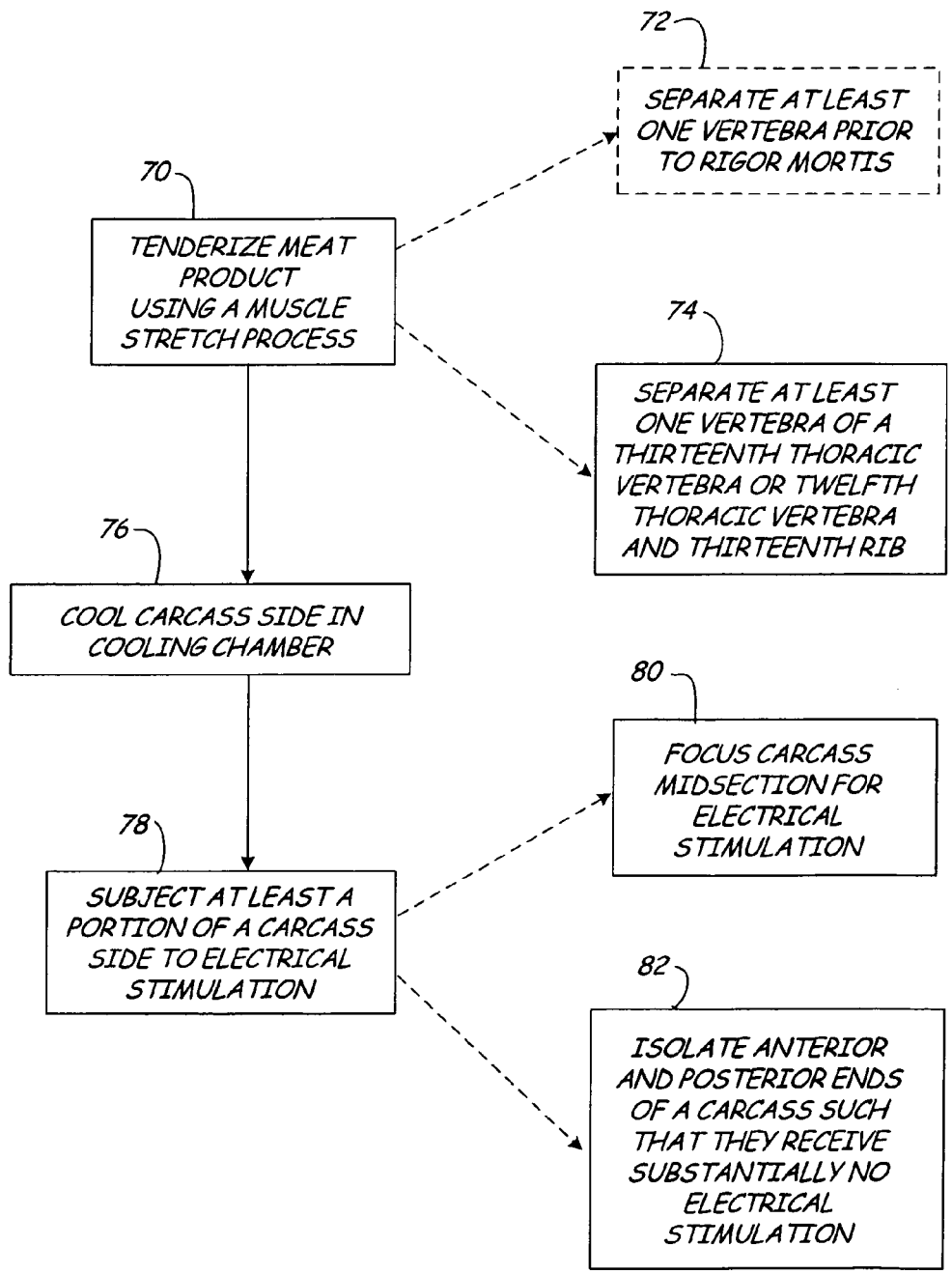
FIG. 5 is a schematic flowchart of a method for cooling and tenderizing a carcass side.

In one embodiment of the present invention, the cooling chamber 50 of the present invention is used in combination with a muscle stretch process to further improve the tenderness of the resulting meat product. As shown in FIG. 5, the meat product may be tenderized using a muscle stretch process, shown at block 70 in conjunction with cooling the carcass side in the cooling chamber, shown at block 76. For example, in one embodiment, the cooling chamber 50 is used in conjunction with the process disclosed in co-pending U.S. pat. application number 09/771,760, filed Jan. 29, 2001, entitled "Method for Tenderizing Meat," which is hereby incorporated by reference in its entirety. In this embodiment, at least one vertebra of a carcass or a carcass side is separated prior to rigor mortis, shown at block 72, to enable stretching of the muscle fibers. The act of separating is performed at commercial chain speeds. In one embodiment, the act of separating is performed at a rate of at least 150 carcasses (i.e., 300 carcass sides) per hour. In another embodiment, the act of separating is performed at a rate of at least about 300 carcasses per hour. The vertebra is separated, in one embodiment, without complete separation of the connective tissue, fat, or minor muscles adjacent the vertebra. In one embodiment, the act of separating is performed on a thirteenth thoracic vertebra or on a twelfth thoracic vertebra and a thirteenth rib of the carcass or carcass side, shown at block 74.

In one embodiment, this muscle stretch process of block 70 is performed prior to the carcass side entering the cooling chamber 50 for cooling of the carcass side shown in block 76. The act of separating a vertebra exposes portions of lean muscles located near the separated vertebra. During the steam pasteurization process, the surface of this exposed lean muscle is susceptible to cooking or scorching. Accordingly, in this embodiment, an additional nozzle may be added to the coolant supply pip 52 at a height corresponding to the location of the separated vertebra or the exposed lean muscle surface, such that coolant is directed into contact with the muscle surfaces surrounding the separated vertebra to provide rapid cooling and prevent scorching of these muscles.

In another embodiment, the cooling chamber 50 of the present invention is used in combination with a process where the carcasses are subjected to electrical stimulation in a further effort to tenderize the meat of the carcass, shown at block 78. In some electrical stimulation processes, electrical stimulation is applied to the carcass at fifty volts for approximately thirty to sixty second. In one embodiment, the electrical stimulation is applied only to the thinner middle meats of the carcass, shown at block 80, without substantially electrically stimulating the end sections of the animal carcass. In this embodiment, the ends sections are not targeted for electrical stimulation. Rather, the midsection is targeted for electrical stimulation and the end sections may receive, in view of their proximity to the midsection, a minor amount of electrical stimulations. Accordingly, electrical stimulation is concentrated or focused in the midsection of the animal carcass, and the amount or extent of electrical stimulation in the end sections is expected to be significantly less than provided in the midsection. In one embodiment, the end sections, namely the anterior and posterior ends, are electrically isolated such that they receive little or no electrical stimulation, shown at block 82. The applicants hereby incorporate by reference, in its entirety, U.S. Patent Application No. 09/562,614, filed May 1, 2000 entitled "Method for Processing an Animal Carcass and Apparatus for Providing Electrical Stimulation," issued as U.S. Pat. 6,290,592, which discusses and details an electrical stimulation procedure and apparatus. In a further embodiment, shown in FIG. 5, the cooling chamber 50 of the present invention is used in combination with both a muscle stretch process, shown at block 70, and an electrical stimulation process, shown at block 78.

While the present invention is described with reference to a beef carcass and its sides, the methods and devices disclosed could also be used for cooling any other fresh meat animal carcasses. For example, other fresh meat animal carcass include bovine, porcine, ovine, and equine animals. Bovine animals include, but are not limited to, cattle, steers, heifers, cows, bulls, yak, and also buffalo. Porcine animals include, but are not limited to, sows, gilts, barrows, boars, and feeder pigs. Ovine animals include, but are not limited to, sheep and lamb.

Although the present invention has been described with reference to preferred embodiments, persons skilled in the art will recognize that changes may be made in form and detail without departing from the spirit and scope of the invention.

I claim:

1. A method of cooling at least a portion of a cattle carcass side, the method comprising:

guiding the carcass side into a cooling chamber;

directing a coolant through first and second coolant nozzles, the first coolant nozzle being positioned above a horizontal axis and the second coolant nozzle being positioned below the horizontal axis, wherein a portion of the carcass side including a cavity portion is positioned below the horizontal axis;

wherein directing the coolant through the first coolant nozzle comprises directing the coolant through a spray nozzle of the first coolant nozzle, wherein the spray nozzle is disposed substantially parallel to a line extending perpendicular to a direction of travel of the carcass side; and wherein directing the coolant through the second coolant nozzle comprises directing the coolant such that the coolant contacts interior muscles located within the cavity portion of the carcass side and includes directing the coolant through alternating oppositely directed first and second spray nozzles of the second coolant nozzle, wherein the first and second spray nozzles are disposed at first and second nonzero angles with respect to a line extending perpendicular to a direction of travel of the carcass side.

2. The method of claim 1, wherein the horizontal axis is positioned about 35 inches from an anterior end of the carcass.

3. The method of claim 1, wherein the first coolant nozzle is positioned approximately nineteen inches from an anterior end of the carcass.

4. The method of claim 1, wherein the first coolant nozzle is positioned approximately thirty inches from an anterior end of the carcass.

5. The method of claim 1, wherein the second coolant nozzle is positioned approximately forty inches from an anterior end of the carcass.

6. The method of claim 1, wherein the second coolant nozzle is positioned approximately fifty-two inches from an anterior end of the carcass.

7. The method of claim 1, wherein the coolant is water.

8. The method of claim 1, wherein one of the first and second angles is sufficient to cause coolant to contact a tenderloin portion of the carcass side.

9. The method of claim 1, wherein each of the first and second angles is between about 10 and about 50 degrees with respect to a line extending perpendicular to a direction of travel of the carcass side.

10. The method of claim 1, wherein the coolant is directed toward the carcass side at a pressure of from about 30 to about 50 psi.

11. The method of claim 1, wherein the coolant is directed toward the carcass side by at least one nozzle at a volumetric flow rate of from about 0.8 to about 1.1 gallons per minute per nozzle.

12. The method of claim 1, wherein prior to the guiding step, a portion of the carcass side is subjected to steam pasteurization.

13. The method of claim 12, further comprising separating at least one vertebra of the carcass prior to steam pasteurization.

14. The method of claim 13, wherein separating at least one vertebra is performed on a thirteenth thoracic vertebra or on a twelfth thoracic vertebra and a thirteenth rib of the carcass side.

15. The method of claim 13, wherein coolant is directed through the second coolant nozzle toward the carcass side at a height corresponding to the location of an exposed muscle surface located near the separated vertebra.

16. The method of claim 12, further comprising electrically stimulating at least a portion of the carcass side prior to subjecting a portion of the carcass side to steam pasteurization.

17. The method of claim 16, wherein the electrically stimulating step includes focusing electric current along a midsection of the carcass side to provide stimulated muscles in the midsection.

18. The method of claim 17, further comprising isolating an anterior and a posterior end of the carcass side such that muscles of the anterior and posterior ends receive substantially no electrical stimulation.

19. A method of cooling at least a portion of a cattle carcass side, the method comprising:

guiding the carcass side into a cooling chamber; directing a coolant through first and second coolant nozzles, the first coolant nozzle being positioned above a horizontal axis and the second coolant nozzle being positioned below the horizontal axis, wherein a portion of the carcass side including a cavity portion is positioned below the horizontal axis;

wherein directing the coolant through the first coolant nozzle comprises directing the coolant through a spray nozzle of the first coolant nozzle, wherein the spray nozzle is disposed substantially parallel to a line extending perpendicular to a direction of travel of the carcass side; and wherein directing the coolant through the second coolant nozzle comprises directing the coolant such that the coolant contacts interior muscles located within the cavity portion of the carcass side and includes directing the coolant through first and second spray nozzles of the second coolant nozzle, the first and second spray nozzles being disposed generally opposite one another, wherein the coolant is directed through the first spray nozzle toward the carcass side at a first nonzero angle with respect to a line extending perpendicular to a direction of travel of the carcass side and through the second spray nozzle at a second nonzero angle with respect to a line extending perpendicular to a direction of travel of the carcass side;

wherein the coolant thus directed through the first and second spray nozzles of the second coolant nozzle is directed toward the interior muscles located within the cavity portion of the carcass side.

20. The method of claim 19, wherein the first angle is between about 10 and about 50 degrees with respect to a line extending perpendicular to a direction of travel of the carcass side.

21. The method of claim 19, wherein the second angle is between about 10 and about 50 degrees with respect to a line extending perpendicular to a direction of travel of the carcass side.

22. The method of claim 19, wherein the first and second angles are equal and opposite with respect to a line extending perpendicular to a direction of travel of the carcass side.

23. The method of claim 19, wherein one of the first and second angles is sufficient to cause the coolant to contact a tenderloin portion of the carcass side.

* * * * *